US010995916B1

(12) United States Patent
Murphy

(10) Patent No.: US 10,995,916 B1
(45) Date of Patent: May 4, 2021

(54) RIGID AND LIGHTED FLAG FOR A VEHICLE

(71) Applicant: Matthew Murphy, Camas, WA (US)

(72) Inventor: Matthew Murphy, Camas, WA (US)

( * ) Notice: Subject to any disclaimer, the term of this patent is extended or adjusted under 35 U.S.C. 154(b) by 0 days.

(21) Appl. No.: 16/853,286

(22) Filed: Apr. 20, 2020

Related U.S. Application Data

(60) Provisional application No. 62/972,704, filed on Feb. 11, 2020.

(51) Int. Cl.
| | |
|---|---|
| *F21S 2/00* | (2016.01) |
| *F21V 23/04* | (2006.01) |
| *B60L 50/60* | (2019.01) |
| *B60L 8/00* | (2006.01) |
| *F21W 107/10* | (2018.01) |
| *F21Y 115/10* | (2016.01) |

(52) U.S. Cl.
CPC ............... *F21S 2/005* (2013.01); *B60L 8/003* (2013.01); *B60L 50/60* (2019.02); *F21V 23/0464* (2013.01); *F21W 2107/10* (2018.01); *F21Y 2115/10* (2016.08)

(58) Field of Classification Search
CPC ...... F21S 2/005; F21V 23/0464; B60L 50/60; B60L 8/003
See application file for complete search history.

(56) References Cited

U.S. PATENT DOCUMENTS

| | | | | |
|---|---|---|---|---|
| 5,012,603 | A * | 5/1991 | Elcock | G09F 7/00 40/574 |
| 7,192,168 | B2 * | 3/2007 | Day | G09F 13/22 362/249.03 |
| 8,146,278 | B1 * | 4/2012 | Grant | G09F 21/048 40/591 |
| 9,928,764 | B2 * | 3/2018 | Heath | B60Q 1/268 |
| 2005/0083693 | A1 * | 4/2005 | Garrett | G09F 17/00 362/253 |
| 2010/0117560 | A1 * | 5/2010 | Cao | F21V 23/005 315/294 |

* cited by examiner

*Primary Examiner* — Thomas M Sember
(74) *Attorney, Agent, or Firm* — Brennan, Manna & Diamond, LLC

(57) ABSTRACT

The present invention relates generally to a rigid and lighted flag assembly for a vehicle. The flag assembly is preferably comprised of a flag mast, a rigid flag, a plurality of lights for lighting the flag, and a power source for powering the lights. The flag assembly allows the content of the flag to be viewable at all times, regardless of the vehicle's speed and regardless of the time of day or night. The flag portion of the flag assembly is less susceptible to the elements, such as wind, snow, sleet, rain, and the like, as well as harmful ultraviolet rays from the sun. Further, the flag assembly is capable of simultaneously supporting more than one rigid flag device at a time, and does not negatively affect the aerodynamics of the vehicle.

16 Claims, 6 Drawing Sheets

RIGID AND LIGHTED FLAG FOR A VEHICLE

CROSS-REFERENCE TO RELATED APPLICATION

The present application claims priority to and the benefit of U.S. Provisional Application No. 62/972,704 filed on Feb. 11, 2020, which is incorporated herein by reference in its entirety.

BACKGROUND

The present invention relates generally to a rigid and lighted flag assembly for use with a vehicle having a retractable window, such as an automobile, truck, bus, motorhome, etc. More specifically, the present invention relates to a rigid and durable flag device comprised of a flag mast having one or more rigid flags removably attached to a first end of the flag mast, and a second end for removably engaging with a retractable window on the vehicle. More specifically, the structure of the second end of the flag mast engages, and is securely positioned between, an upper portion of the window and the window frame. Additionally, the flag mast and/or the flag itself may further comprise a plurality of lights in communication with a power source for illuminating the flag during the nighttime or in other low light environments. Accordingly, the present specification makes specific reference thereto. However, it is to be appreciated that aspects of the present invention are also equally amenable to other like applications, devices and methods of manufacture.

A variety of car or vehicle flag devices exist today that allow a user to display a small flag bearing a logo, message, advertisement, sports team, etc. from their vehicle. Said existing car flag devices are typically secured to the vehicle by positioning a portion of the device in between a closed window on the vehicle and the window frame and/or vehicle body, wherein an overhanging lip of the flag stem is placed over the edge of the window, thus effectively securing the device between the window and car body. Such vehicle flag devices are also comprised of a non-rigid flag material fixedly attached to a stem, such as a cloth manufactured of cotton, polyester or similar artificial material. However, such existing vehicle flag devices contain a variety of limitations and functional inefficiencies due to their construction, composition and/or orientation and are, therefore, less than ideal.

For example, the use of a non-rigid material for the flag body, such as a cloth, thin vinyl or other flaccid material poses several limitations/functional inefficiencies, which includes the non-continuous display of the flag and its content. More specifically, because the flag body is non-rigid, the flag is only fully extended/displayed in a horizontal position when the vehicle the device is attached to is traveling at a sufficient speed to cause the flag to extend outwardly in a trailing fashion. Therefore, the content of the flag is not visible to others when a vehicle is parked or is traveling at a relatively slow speed. This is obviously undesirable, as a user most likely wishes for their flag and its content to be seen at all times by whomever comes into contact or viewing distance of the user's vehicle. Furthermore, most non-rigid flag bodies are aero-dynamically inefficient, and could negatively affect fuel consumption when traveling at high speeds such as during highway travel.

In addition, the cloth, polyester or other artificial material construction of some existing flags can be heavily affected by the sun, rain, wind, snow, sleet and other elements which could lead to the premature deterioration of the flag. For example, such flags tend to deteriorate along the trailing edge of the flag due to the constant flapping in the wind, particularly when the vehicle is travelling at high rates of speed. Further, such deterioration is oftentimes accelerated by the elements, such as rain, snow, sleet and the like, and/or the sun's harmful ultraviolet rays which tend to deteriorate the fabric of the flag, or cause its colors to fade prematurely. Additionally, in the case of a flag which has images and/or content on both sides of the flag, sunlight may shine in such a way from one side of the flag that the image on the opposite side of the flag is visible from said first side as well, which may further impede an individual's ability to discern the flag's content. Further, because said flag assemblies are permanently attached to the flag mast, the entire device must be discarded if the flag and/or flag mast is damaged.

Another limitation associated with existing vehicle flag devices is the fact that they are not discernible at night or in other low light environments, thereby significantly limiting their usefulness. Further, yet another limitation of said prior art flag devices is the fact that said devices limit the user in regards to the specific flag a user can display, as most car flag devices are only designed to display one flag on any one device. Thus, if a user wishes to display multiple flags at the same time, they must purchase multiple vehicle flag devices to do so, which can be expensive and the use of one such device may interfere with the use of a second device.

Accordingly, there exists a long felt need in the art for a rigid and lighted flag device for use with a vehicle that allows the content of the flag to be viewable at all times, regardless of the vehicle's speed. Furthermore, there is also a long felt need in the art for an improved car flag device that is less susceptible to the elements, such as wind, snow, sleet, rain, and the like, as well as harmful ultraviolet rays from the sun. There also exists a long felt need in the art for an improved car flag device that is comprised of lighting that allows the content of the flag to be viewable at night, or in other low light environments. Finally, there is a long felt need in the art for an improved car flag device that allows the user to display a plurality of easily interchangeable flags on a single flag mast, while offering improved aerodynamics for each flag.

The present invention, in one exemplary embodiment, discloses a rigid and lighted flag assembly or device for use with a vehicle, and that is comprised of a rigid frame or mast, one or more rigid flag members removably attached thereto, at least one light for lighting the flag, and a power source for powering said light. More specifically, the rigid mast is removably attached to a retractable window on a vehicle, such as those found on an automobile, truck, bus, motorhome, etc., and the flag itself may be fixedly or removably attached to the flag mast, either directly or via a flag pouch with a corresponding lid.

The at least one light is preferably a plurality of lights that may be integrally formed in or attached to the rigid flag assembly for lighting the same at night or in other low light environments, or may be attached to the rigid flag mast and project lighting onto the rigid flag portion in such low light environments. The lights are preferably powered by an onboard power supply, such as a battery, but may also be solar powered or in electrical communication with the vehicle's existing electrical system. The rigid and lighted flag device may further comprise a light sensor in electrical communication with the power supply such that electrical power is automatically provided to the integrated light(s) via the electrical wiring when a sufficient level of darkness (e.g., lack of light) is detected.

In this manner, the improved rigid and lighted flag device of the present invention accomplishes all of the forgoing objectives, thereby allowing the content of the vehicle flag to be viewable at all times regardless of vehicle speed, as well as at night or under dimly lit conditions. Finally, the device allows the user to display a plurality of interchangeable flags on one device and at the same time, thereby eliminating the need for a user to purchase multiple devices to display multiple flags, as well as giving the user the ability to quickly interchange said flags.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, discloses and comprises an improved rigid and lighted flag assembly for a vehicle. The rigid and lighted flag assembly is preferably comprised of a rigid frame or mast, a rigid flag member removably attached thereto, at least one light and a power source for powering said light. More specifically, the rigid mast further comprises a structure positioned on the opposite end of the rigid flag member for removably attaching the flag device to a vehicle window, and a longitudinal channel therein for receipt of a corresponding longitudinal male portion on the rigid flag member, thereby removably securing the rigid flag to the mast in a dove-tail or tongue and groove fashion. It is also contemplated that multiple rigid flag assemblies can be simultaneously attached to the flag mast in this manner, and in a stacked fashion.

The rigid flag mast may also comprise an internal longitudinal opening therein for housing a battery and associated wiring for powering the at least one light. The at least one light is preferably a plurality of lights that may be integrally formed in or attached to the rigid flag assembly for lighting the same at night or in other low light environments. Alternatively, the lights may be integrally formed in or attached to the rigid flag mast, and project lighting onto the rigid flag portion in such low light environments.

In a further preferred embodiment of the present invention, the flag mast may also comprise a light sensor in electrical communication with the power supply such that electrical power is automatically provided to the integrated light(s) via the electrical wiring when a sufficient level of darkness (e.g., lack of light) is detected. More specifically, the rigid and lighted flag device may comprise a battery and associated wiring for powering the lights, wherein the light sensor automatically activates the lights in low lit environments and deactivates the lights during the daytime to conserve energy or battery life. In an alternative embodiment of the rigid and lighted flag device, the device may comprise a solar panel/photovoltaic cells to power said lights, or the lights may be in electrical communication with the vehicle's existing electrical system.

Alternatively, it is contemplated that a transparent or translucent flag pouch may be fixedly attached to the flag mast for receipt of one or more different flags that may be interchangeably inserted therein. Said transparent or translucent flag pouch may further comprise one or more lights in electrical communication with the device's power supply. Alternatively, the flag inserts themselves may have their own lights, or light may be projected thereon via the lights positioned along the rigid flag mast.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
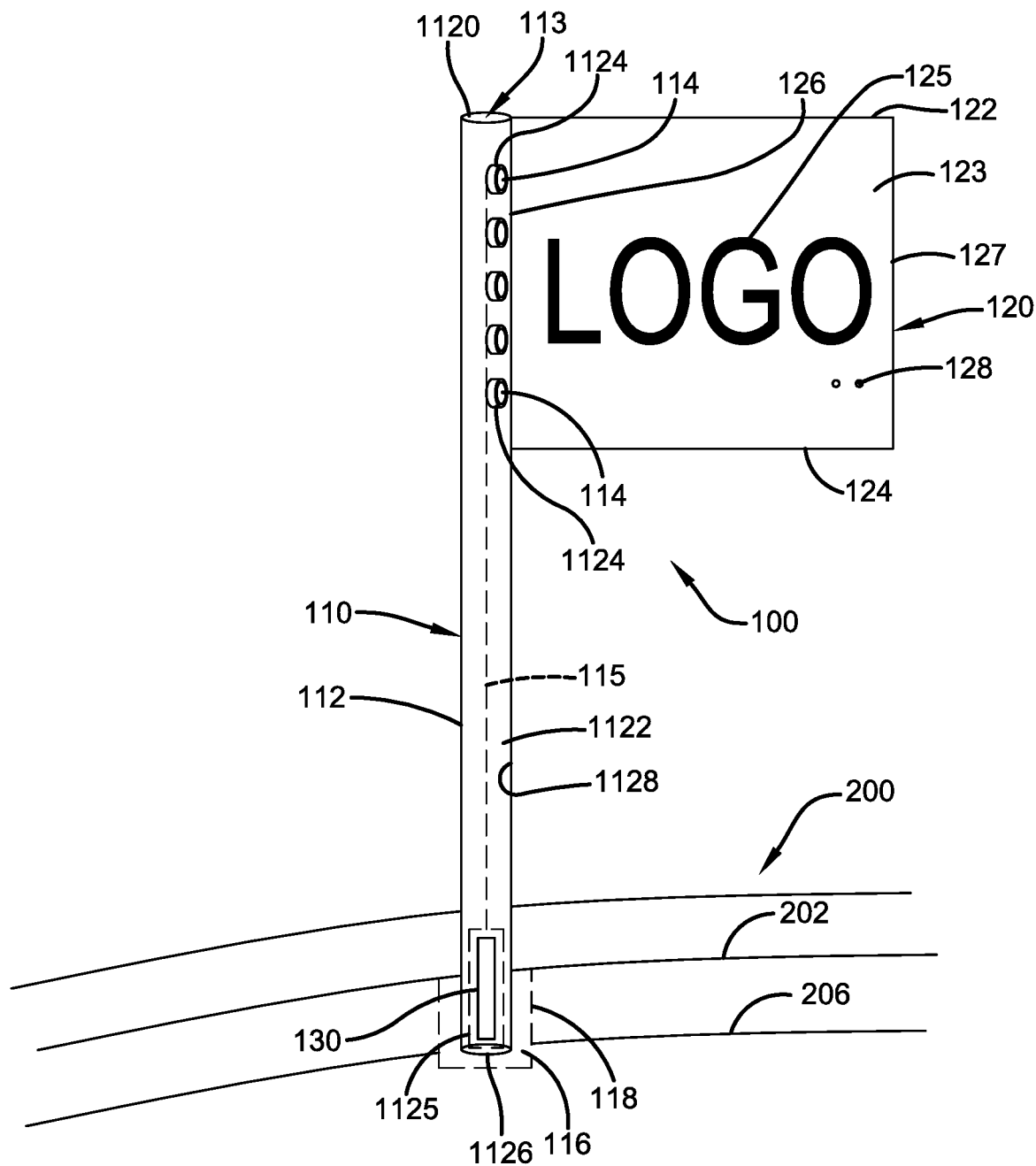
FIG. 1 illustrates a front perspective view of one possible embodiment of the rigid and lighted flag assembly of the present invention removably attached to a vehicle in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, a long felt need in the art exists for a rigid and lighted flag device for use with a vehicle that allows the content of the flag to be viewable at all times regardless of the vehicle's speed, and that is relatively weather resistant and less susceptible to the elements, such as wind, snow, sleet, rain, and the like, as well as harmful ultraviolet rays from the sun. There also exists a long felt need in the art for an improved vehicle flag device that is comprised of lighting that allows the content of the flag to be viewable at night, or in other low light environments. Finally, there is a long felt need in the art for an improved vehicle flag device that allows the user to display a plurality of easily interchangeable flags on a single flag mast, while offering improved aerodynamics for each flag.

Referring initially to the drawings, FIG. 1 illustrates a front perspective view of one possible embodiment of the rigid and lighted flag assembly or device 100 of the present invention removably attached to a vehicle 200 in accordance with the disclosed architecture. The flag device 100 is preferably comprised of a rigid frame or flag mast 110, a rigid flag member 120 removably attached thereto, at least one and preferably a plurality of lights, and a power source for powering said lights. More specifically, and as best shown in FIG. 1, flag mast 110 is preferably comprised of a generally cylindrical and elongated body member 112, a light sensor 113, a plurality of mast lights 114, wiring 115, a first wall portion 116, a second wall portion 118 and a lip 119. Unless otherwise stated, each structural component of flag mast 110 is preferably comprised of a durable, high tensile strength plastic, acrylic, vinyl, or any other suitably rigid and weather resistant material, and may be molded or created by other known manufacturing techniques.

Figure 2:
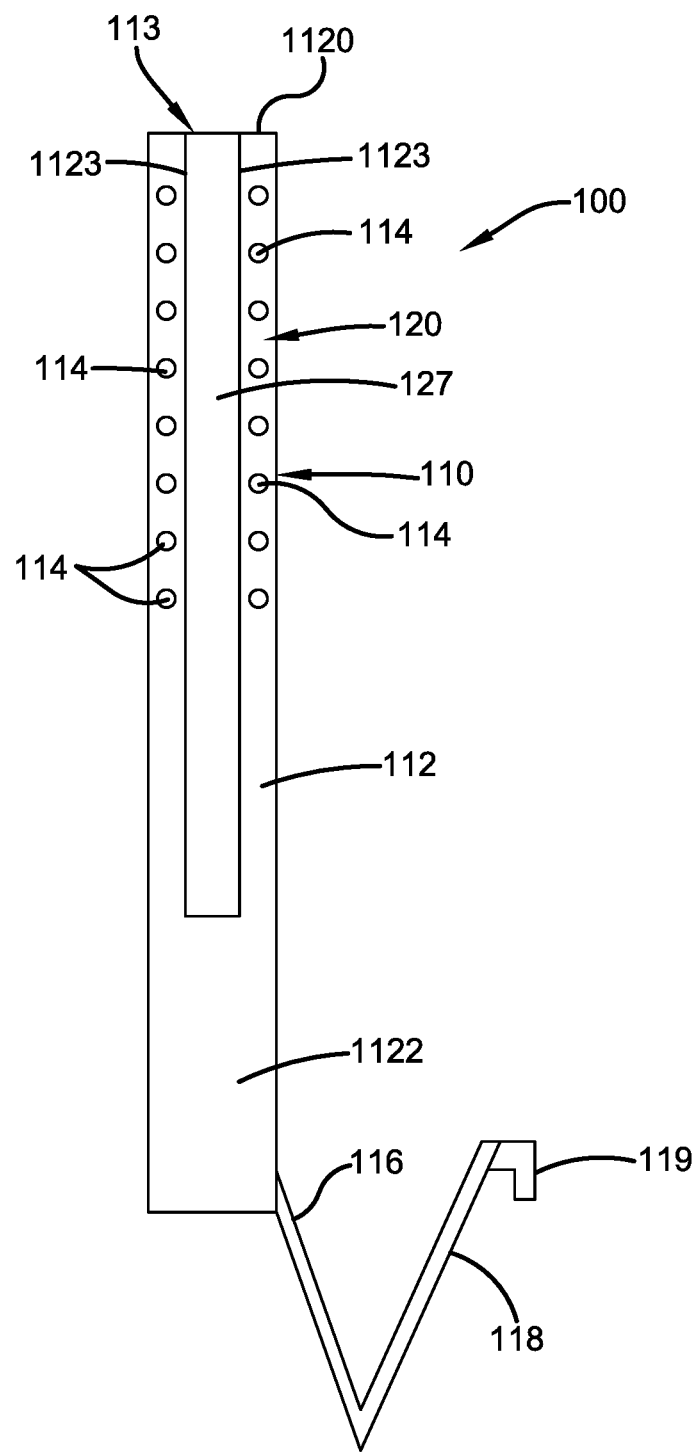
FIG. 2 illustrates a side perspective view of one possible embodiment of the rigid and lighted flag assembly of the present invention in accordance with the disclosed architecture.
Figure 3:
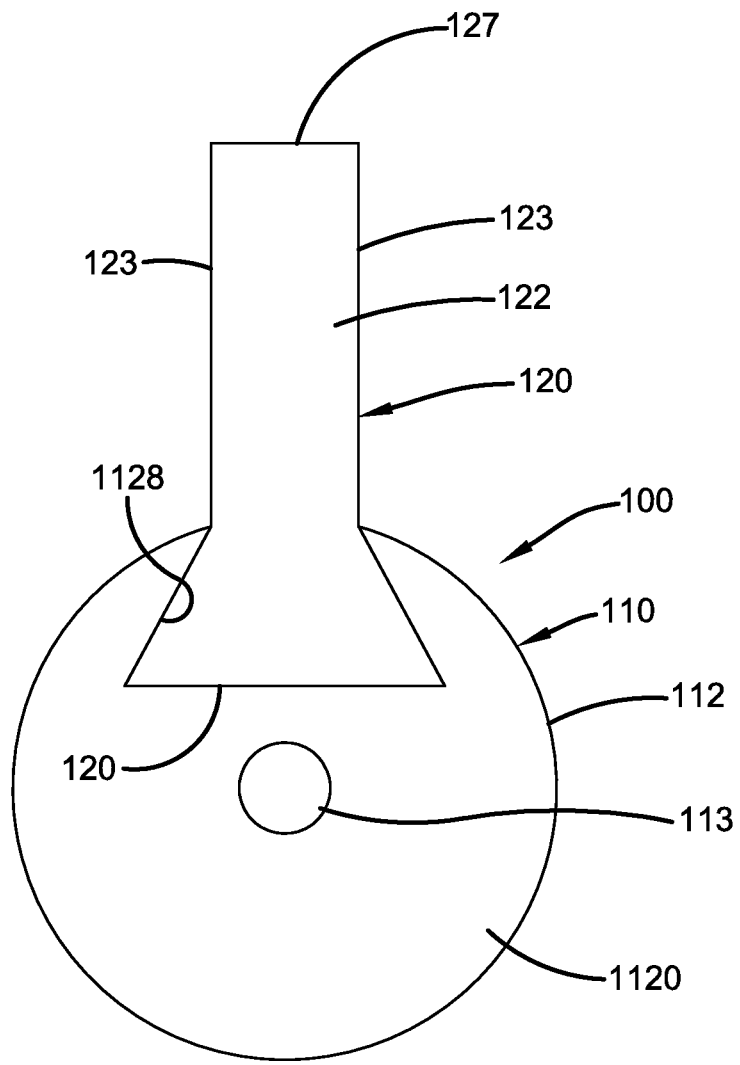
FIG. 3 illustrates a top perspective view of one possible embodiment of the rigid and lighted flag assembly of the present invention in accordance with the disclosed architecture.

As best shown in FIGS. 1, 2 and 3, elongated body member 112 may be further comprised of a top surface 1120, a side surface 1122, a plurality of light hoods 1124, a battery compartment 1125, a battery compartment lid or closure 1126, and a longitudinal channel or opening 1128 formed in the side surface 1122 and extending along at least a length of the elongated body member 112 for receipt of a portion of flag member 120, as described more fully below. Light sensor 113 may be positioned along the top surface 1120 of body member 112 and facing the sky, but may also be positioned elsewhere along body member 112 including, for example, along the side surface 1120, provided that the same is capable of detecting the presence of light in the surrounding environment.

Mast lights 114 (and all other lights described herein to which the following discussion also applies) are preferably LED lights, and can be of any suitable single or multiple colors and suitable uniform or variable sizes. Mast lights 114 may be operated by the means of one or more switches (not shown). As used in the present disclosure, a "switch" refers to an electrical device that starts and stops, or otherwise modifies, the flow of electricity through an electric circuit by completing or interrupting an electric circuit. Completing or interrupting an electric circuit with a switch is often referred to as closing or opening a switch, respectively. In one embodiment, the plurality of LED lights 114 may be waterproofed by, for example, encasing the same in a waterproof compound, coating or membrane, or by shielding the same with light hoods 1124, which also help to direct the light emanating from mast lights 114 in the direction of the flag 120 attached thereto. More specifically, mast lights 114 are angled in such a way as to illuminate with horizontal light beams the side surfaces 123 of each flag 120. Further, the light hoods 1124 not only protect each mast light 114, but also may overhang the surface of each mast light 114 to ensure that all light emitted from the light 114 is directed towards the flag(s) 120 to illuminate the same.

In another embodiment, the LED mast lights 114 may be smart LEDs, which work based on ambient light sensing, which turns on in dim or low light conditions, or at night. The LED mast lights 114 may also be controlled by light sensor 113 so that they will automatically turn on in a low light setting. More specifically, when electric power is supplied to the LED mast lights 114 and the amount of available light in the surrounding area is low enough, the LED mast lights 114 will automatically turn on, otherwise they will remain off to conserve battery life. Alternately, the LED mast lights 114 may be controlled based on the presence of light detected from the light sensor 113 such that it turns on slowly in the evening as it gets darker outside and fades off in the morning as the amount of ambient light increases slowly.

As one skilled in the art will appreciate, LED mast lights 114 may also be wired such that all lights 114 remain on in a well-defined state, flash simultaneously in a regular on and off pattern, flash in a fluctuating manner if required, flash simultaneously in a pattern of any number of quick flashes followed by an off state of longer duration before repeating the pattern of quick flashes, flash in any type of regular or irregular pattern to include specific codes, flash in a programmed or random sequence, or any combination or variation thereof to make the invention more clear and useful. The known circuitry and wiring 115 for controlling the LED mast lights 114 is preferably located within body member 112 and in electrical communication with a power source.

The power source may be used to provide power to the mast lights 114 via wiring 115. More specifically, the power supply may be comprised of a battery 130 stored in battery compartment 1125 and accessible via battery compartment lid 1126. Alternatively, the electrical power for mast lights 114 may be provided by the electrical system of vehicle 200, a solar panel, a photovoltaic panel, or other suitable power source. If a battery 130 is used, it may be a disposable battery or a rechargeable battery, and may be easily replaced or removed if necessary, for recharging. In one embodiment, the batteries 130 can be selected from disposable batteries or rechargeable batteries, and are preferably double-A sized batteries in sufficient quantity to provide power to a maximum number of LED mast lights 114. Suitable batteries 130 include alkaline, nickel-cadmium, nickel-metal hydride, etc.

In one embodiment, alternate power sources may also be used to power mast lights 114 such as solar power cells electrically connected to solar panels (not shown) secured to the flag mast 110. More specifically, the solar panel can be charged during daylight and will provide power to the LED mast lights 114 at night or in other low light environments. Throughout this specification the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used.

As best shown in FIGS. 1 and 2, each of first wall portion 116, second wall portion 118 and lip 119 are positioned on an end of flag mast 110 opposite of that of flag 120, and are useful for attaching rigid and lighted flag device 100 to a retractable window 206 on a vehicle 200, such as an automobile, truck, bus, motorhome, etc. More specifically, first wall portion 116 is fixedly attached to, or integrally formed with, second wall portion 118 at an angle such that when lip 119 is positioned between retractable window 206 and an exterior body 202 or portion of window trim 204 of vehicle 206, flag mast 110 will be extending upwardly towards the sky and roughly perpendicular to the ground surface upon which the vehicle 200 travels. To attach the rigid and lighted flag device 100 to a vehicle 200, a user simply places the lip 119 of the flag mast 110 over the edge of the vehicle window 206. The weight of the flag device 100 will caused the lip 119 and $2^{nd}$ wall portion 118 to press against all surfaces of the window 206 when the device is pinched between the window 206 and the exterior body 202 or window trim 204, thereby removably securing the flag device 100 to the vehicle 200.

Figure 4:
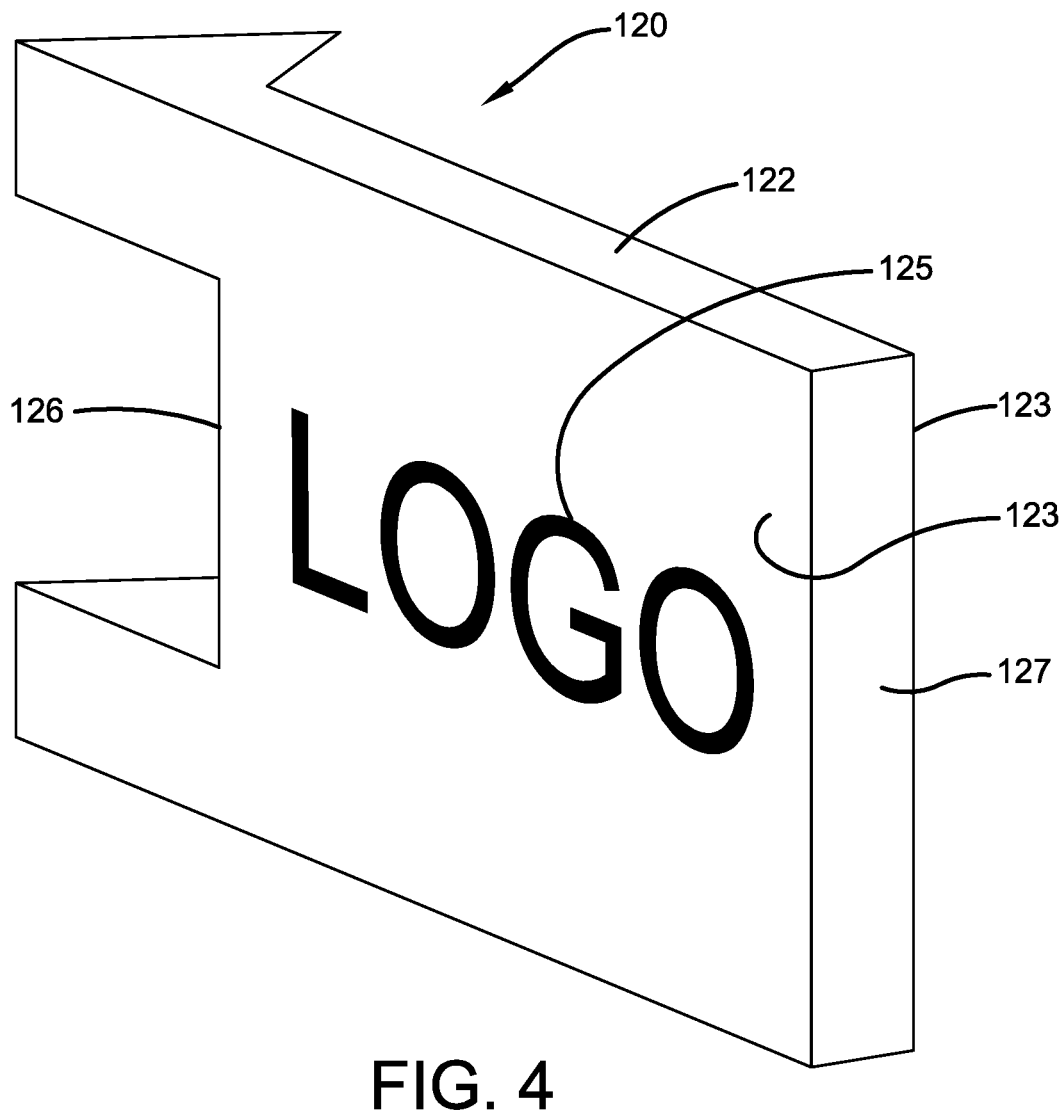
FIG. 4 illustrates a side perspective view of one possible embodiment of the rigid flag assembly of the present invention in accordance with the disclosed architecture.

FIG. 4 illustrates a side perspective view of one possible embodiment of the rigid flag assembly 120 of the present invention in accordance with the disclosed architecture. Rigid flag 120 is preferably comprised of a top surface 122, opposing side surfaces 123, a bottom surface 124, an inboard end 126, an opposing outboard end 127 and one or more flag lights 129. As best shown in FIGS. 3 and 4, at least a portion of the inboard end 126 (i.e., the end of flag 120 closest to flag mast 110), is preferably shaped to correspond to the shape of opening 1129 formed in side surface 1122 of body member 112, as described more fully herein. Unless otherwise stated, each structural component of flag 120 is preferably comprised of a durable, high tensile strength plastic, acrylic, vinyl, or any other suitably rigid and weather resistant material, and may be molded or created by other known manufacturing techniques.

Flag 120 may also be generally planar, as shown in FIG. 1 through 5, or may be non-planar to suit user need and/or preference. For example, rigid flag 120 may be generally wavy in form to give the appearance of the flag 120 furling in the wind. Additionally, the opposing side surfaces 123 of the flag 120 can be comprised of any logo, message, advertisement, image, number, emblem, word, etc. 125 desired by the user. For example, the logo 125 may be the emblem of the user's favorite team in a particular sport, such as football, baseball, basketball, hockey, soccer or the like, or convey other information about the user's likes or dislikes. As previously stated, flag 120, and indeed logo 125, may be further comprised of one or more flag lights 129 that are in electrical communication with battery 130 or any other power source, and that function similarly to flag mast lights 114 discussed supra.

Figure 5:
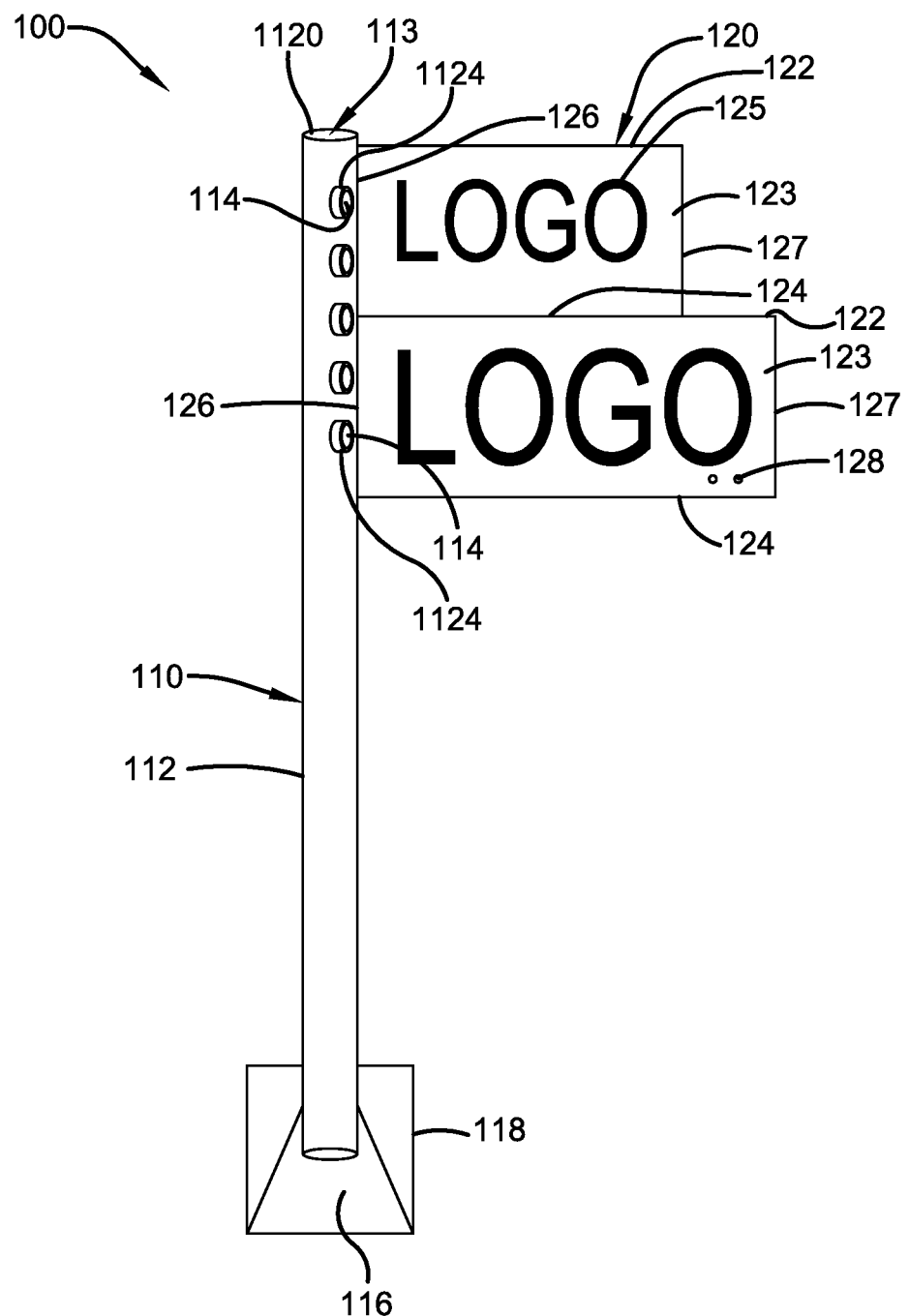
FIG. 5 illustrates a front perspective view of an alternative embodiment of the rigid and lighted flag assembly of the present invention in accordance with the disclosed architecture, wherein two separate rigid flag assemblies are removably attached to the flag mast in a stacked manner.

As previously stated and best shown in FIGS. 1-3, a longitudinal channel or opening 1128 is formed in the side surface 1122 and extends through the top surface 1120 of body member 112 for receipt of a portion of flag member 120. In differing embodiments of the device 100 of the present invention, opening 1128 can vary in length in order to accommodate only one flag 120 (as shown in FIG. 1) or more than one flag 120 (as shown in FIG. 5). Additionally, as best shown in FIG. 3, opening 1128 if preferably dove tail shaped so that it interlocks with the inboard end 126 of flag member 120. More specifically, to attach the flag 120 to the flag mast 110, a user (not shown) simply slides the flanged inboard end 126 into the channel 1128 from the top surface 1120. The same procedure is repeated to attach a second flag 120 (as shown in FIG. 5) with the bottom surface 124 of one flag 120 being supported on top of the top surface 122 of another flag 120. In this manner, one or more flag members 120 may be removably, yet securely, attached to flag mast 110 and will not prematurely detach. Notwithstanding, it is also contemplated that other geometric or non-geometric shapes (e.g., tongue and groove) may be used for inboard end 126 and opening 1128 without affecting the overall concept of the present invention, provided that the same interlock.

FIG. 5 illustrates a front perspective view of an alternative embodiment of the rigid and lighted flag assembly 100 of the present invention in accordance with the disclosed architecture, wherein two separate rigid flags 120 are removably attached to the flag mast 110 in a stacked manner. Each of flags 120 may be of any shape or dimension to suit user need and/or preference, and may further be comprised of logos 125. In this manner, a user can prominently and easily display more than one flag 120 at a time. It should also be noted that the construction of the flag 120 and flag mast 110 allows a user to quickly and easily interchange flags 120 if they so desire, while ensuring that said flags 120 remain secure in the flag mast 110 during use due to the tongue and groove or other interlocked connection.

Figure 6A:
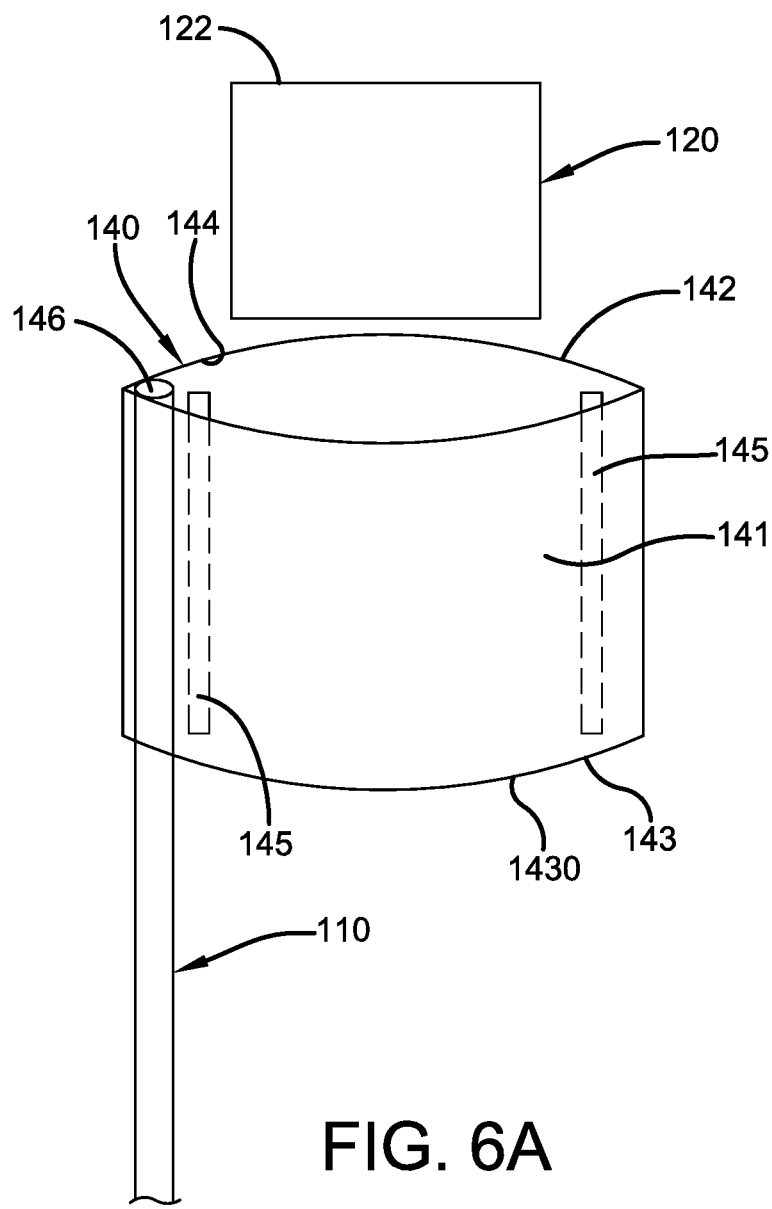
FIG. 6A illustrates a front perspective view of an alternative embodiment of the rigid and lighted flag assembly of the present invention in accordance with the disclosed architecture, wherein a flag pouch is attached to the rigid flag mast for receipt of one or more insertable flag portions.
Figure 6B:
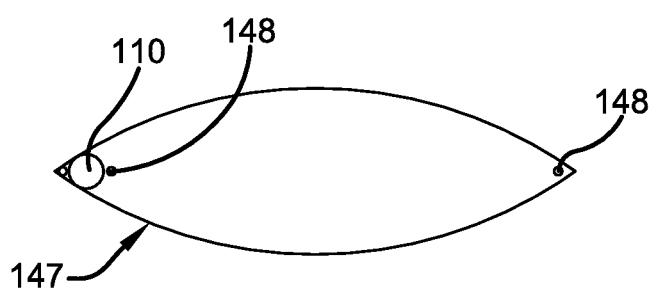
FIG. 6B illustrates a top perspective view of the top of the flag pouch of FIG. 6A in accordance with the disclosed architecture.

FIG. 6A illustrates a front perspective view of an alternative embodiment of the rigid and lighted flag assembly 100 of the present invention in accordance with the disclosed architecture, wherein a flag pouch 140 is attached to the rigid flag mast 110 and is capable of receiving and storing therein one or more insertable flags 120. More specifically, flag pouch 140 is preferably comprised of a transparent or a translucent material so that an individual can easily see the flag(s) 120 stored therein, and may be fixedly or removably attached to flag mast 110. As best shown in FIGS. 6A and 6B, flag pouch 140 is also comprised of a pair of opposing sides 141, a top 142, a bottom 143, an opening 144 for receipt of the flags 120, one or more pouch lights 145, a flag mast opening 146 for receipt of a portion of flag mast 110, a removable pouch lid 147, and one or more fasteners 148 for attaching/removing the removable pouch lid 147 to/from flag pouch 140 while accessing opening 144, for example, to insert or remove a flag 120. Bottom 1430 may have one or more continuous openings 1430 formed therein for draining any water or moisture that may accumulate or form in pouch opening 144.

Pouch lights 145 are in electrical communication with the power source (e.g., battery 130), and may function similar to any of mast lights 114 and/or flag lights 129 as described supra. Additionally, because flag pouch 140 is comprised of a transparent or translucent material, mast lights 114 remain quite effective in illuminating the flags 120 stored therein. In order for a user to access the pouch opening 144, for example, to insert a flag 120 or change the flag 120 currently stored therein, the user (not shown) will simply remove the pouch lid 147 which is removably attached to the pouch 140 by fasteners 148, as best shown in FIG. 6B. Further, because the flags 120 of this embodiment are easily interchangeable, a user has many display options without the need to purchase and subsequently store many different vehicle flag devices, which will save the user both time and money. It is also contemplated that existing Bluetooth or Wi-fi technology can be utilized in conjunction with the present invention, for example, to power the plurality of lights and/or customize the logo or message on the flag.

Notwithstanding any of the forgoing, the rigid and lighted flag device 100 can be any suitable size, shape, and configuration as is known in the art without affecting the overall concept of the invention, provided that it accomplishes the above stated objectives. One of ordinary skill in the art will appreciate that the shape and size of the device 100 and its various components including flag content/logos, as shown in the various FIGS. are for illustrative purposes only, and that many other shapes, sizes and configurations of the device 100 are well within the scope of the present disclosure. Although dimensions of the device 100 and its components (i.e., length, width, and height) are important design parameters for good performance, the device 100 and may be any shape or size that ensures optimal performance during use and/or that suits user need and/or preference. This includes the sizing of the flag mast 110 and each of flag(s) 120, which may differ in size/length to accommodate a range of vehicles/logos.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A flag device for a vehicle having a window comprising:
   a flag mast;
   a rigid flag, wherein a plurality of lights are positioned along a length of the flag mast that is adjacent to the rigid flag for illuminating the rigid flag; and
   a light sensor for activating the plurality of lights, wherein each of the plurality of lights is further comprised of a light hood.

2. The flag device of claim 1 further comprising an electrical power source for providing electrical power to the plurality of lights.

3. The flag device of claim 2, wherein the electrical power source is a battery stored in the flag mast.

4. The flag device of claim 2, wherein the electrical power source is an electrical system of the vehicle or a solar panel.

5. The flag device of claim 1, wherein the rigid flag is removably attached to the flag mast via a tongue and groove configuration.

6. The flag device of claim 1, wherein the plurality of lights are LED lights and coated with a waterproof compound.

7. The flag device of claim 1, wherein a mode of operation of the plurality of lights is comprised of a select one of: (a) an intermittent light; and (b) a strobe light.

8. A flag device for a vehicle having a window comprising:
   a flag mast having a first end and a second end, wherein the first end is removably attachable to the window;
   a rigid flag attached to the second end of the flag mast;
   a plurality of lights for lighting the rigid flag, wherein the plurality of lights are positioned along a length of the flag mast that is adjacent to the rigid flag;
   a light sensor for activating the plurality of lights, wherein each of the plurality of lights is further comprised of a light hood; and
   a power source for powering the plurality of lights.

9. The flag device of claim 8, wherein the power source is a battery stored in the flag mast and that is in electrical communication with the plurality of lights.

10. The flag device of claim 8 further comprising a second rigid flag attached to the flag mast and positioned between the rigid flag and the first end.

11. The flag device of claim 8, wherein the plurality of lights are LED lights having more than two modes of operation.

12. The flag device of claim 11, wherein the more than one mode of operation is comprised of at least two of: (a) a continuous light; (b) and intermittent light; and (c) a strobe light.

13. The flag device of claim 8, wherein the rigid flag is removably attached to the flag mast via a tongue and groove configuration.

14. A flag device for a vehicle having a window comprising:
   a flag mast having a first end and a second end, wherein the first end is removably attachable to the window;
   a flag pouch attached to the second end of the flag mast;
   a rigid flag positioned within the flag pouch;
   a plurality of lights for lighting the rigid flag, wherein the plurality of lights are positioned along a length of the flag mast that is adjacent to the rigid flag;
   a light sensor for activating the plurality of lights, wherein each of the plurality of lights is further comprised of a light hood; and
   a power source for powering the plurality of lights.

15. The flag device of claim 14, wherein the power source is a battery stored in the flag mast and that is in electrical communication with the plurality of lights.

16. The flag device of claim 14, wherein the plurality of lights are LED lights having more than two modes of operation.

* * * * *